United States Patent [19]

Masuyama et al.

[11] Patent Number: 4,981,187
[45] Date of Patent: Jan. 1, 1991

[54] LOAD CELL WEIGHING APPARATUS

[75] Inventors: Tsutomu Masuyama, Numazu; Kazuaki Seki, Shizuoka, both of Japan

[73] Assignee: Tokyo Electric Co., Ltd., Tokyo, Japan

[21] Appl. No.: 405,467

[22] Filed: Sep. 11, 1989

[30] Foreign Application Priority Data

Sep. 13, 1988 [JP] Japan .................................. 63-229032
Sep. 13, 1988 [JP] Japan .................................. 63-229033

[51] Int. Cl.⁵ ...................... G01G 23/14; G01G 3/14; G01L 1/22
[52] U.S. Cl. .................................. 177/164; 177/211; 73/862.67
[58] Field of Search ............................. 177/164, 211; 73/862.67

[56] References Cited

U.S. PATENT DOCUMENTS

| | | | |
|---|---|---|---|
| 4,660,667 | 4/1987 | Uchimura et al. | 177/211 X |
| 4,696,359 | 9/1987 | Glibbery | 177/211 |
| 4,706,767 | 11/1987 | Chou | 177/164 X |
| 4,778,016 | 10/1988 | Uchimura et al. | 177/164 |
| 4,842,085 | 6/1989 | Lang | 177/164 |

FOREIGN PATENT DOCUMENTS

56-154618 11/1981 Japan .

Primary Examiner—George H. Miller, Jr.
Attorney, Agent, or Firm—Frishauf, Holtz, Goodman & Woodward

[57] ABSTRACT

A load cell weighing apparatus comprising a load cell for generating an output voltage corresponding to load weight, an amplifier section for amplifying the output voltage of the load cell, an analog/digital converter for periodically converting the output voltage of the amplifier section to digital data, a processing unit for converting the digital data to weight data based on the amplification factor of the amplifier section and producing display data representing the weight data on a scale of a corresponding weighing range, and a display for displaying the display data supplied from the processing unit. In the load cell weighing apparatus, the amplifier section includes first and second amplifiers connected in tandem, and the processing unit includes a processing circuit for electrically reducing the number of stages of the amplifiers when the digital data input from the analog/digital converter exceeds a predetermined value corresponding to the weight at which the weighing range is switched from a light weight range to a heavy weight range.

15 Claims, 6 Drawing Sheets

LOAD CELL WEIGHING APPARATUS

BACKGROUND OF THE INVENTION

1. Field of the Invention

The present invention relates to a load cell weighing apparatus, the weighing range of which is selectable.

2. Description of the Related Art

Published Unexamined Japanese patent application (PUJPA) No. 56-154618 discloses a conventional load cell weighing apparatus. The load cell weighing apparatus comprises a load cell for generating an output voltage according to a load weight, an amplifier for amplifying the output voltage from the load cell, and an A/D converter for converting the amplified analog output voltage to digital data. The load cell weighing apparatus further comprises an attenuator to select the weighing range. The output voltage of the amplifier is supplied to the A/D converter without passing though the attenuator when a light weight range is selected, and is supplied to the A/D converter through the attenuator when a heavy weight range is selected. This attenuator causes the output voltage of the amplifier to be attenuated by a predetermined degree. The output of the A/D converter is converted to the weight data to be displayed on a scale corresponding to a selected weighing range.

Since the attenuator decreases a variation in input voltage to the A/D converter corresponding to a variation in the load weight, a heavy load can be weighed without increasing an allowable input voltage of the A/D. However the weighing sensitivity in a heavy weight range becomes lower than that in a light weight range.

SUMMARY OF THE INVENTION

The object of the present invention is to provide a load cell weighing apparatus wherein a lowering in the weighing sensitivity caused by the selection of the weighing range can be reduced.

The above object is achieved by a load cell weighing apparatus comprising a load cell unit for generating an output voltage corresponding to load weight, an amplifying circuit for amplifying the output voltage of the load cell unit, the amplifying circuit having a plurality of amplifiers connected in series, an analog/digital converting circuit for periodically converting the output voltage of the amplifying circuit to digital data, a processing circuit for electrically reducing the number of stages of the amplifiers when the digital data input from the analog/digital converting circuit exceeds a predetermined value corresponding to the weight at which the weighing range is switched from a light weight range to a heavy weight range, converting the digital data to weight data based on the amplification factor of the amplifying circuit determined by the number of stages of the amplifiers, and producing display data representing the weight data on a scale of a corresponding weighing range, and a display unit for displaying the display data supplied from the processing circuit.

According to the load cell weighing apparatus of the present invention, when the digital data output from the converting circuit exceeds a predetermined value, the amplification factor of the amplifying circuit is lowered. Thus, an input voltage to the converting circuit, which is applied after the digital data exceeds a predetermined value, can be made lower than the input voltage to the converting circuit, which is applied before the digital data exceeds the predetermined value Consequently, it is possible to increase the variation in the input voltage of the converting circuit corresponding to load weight. In a conventional load cell weighing apparatus employing an attenuator, when digital data output from the converting circuit exceeds a predetermined value, the input voltage of the converting circuit is not made lower than that applied just before the digital data exceeds the predetermined value. Therefore, the load cell weighing apparatus of the present invention can achieve higher weighing sensitivity than the prior art apparatus in a heavy weight range.

DETAILED DESCRIPTION OF THE PREFERRED EMBODIMENTS

A first embodiment of the present invention will now be described with reference to FIGS. 1 to 7.

Figure 1:
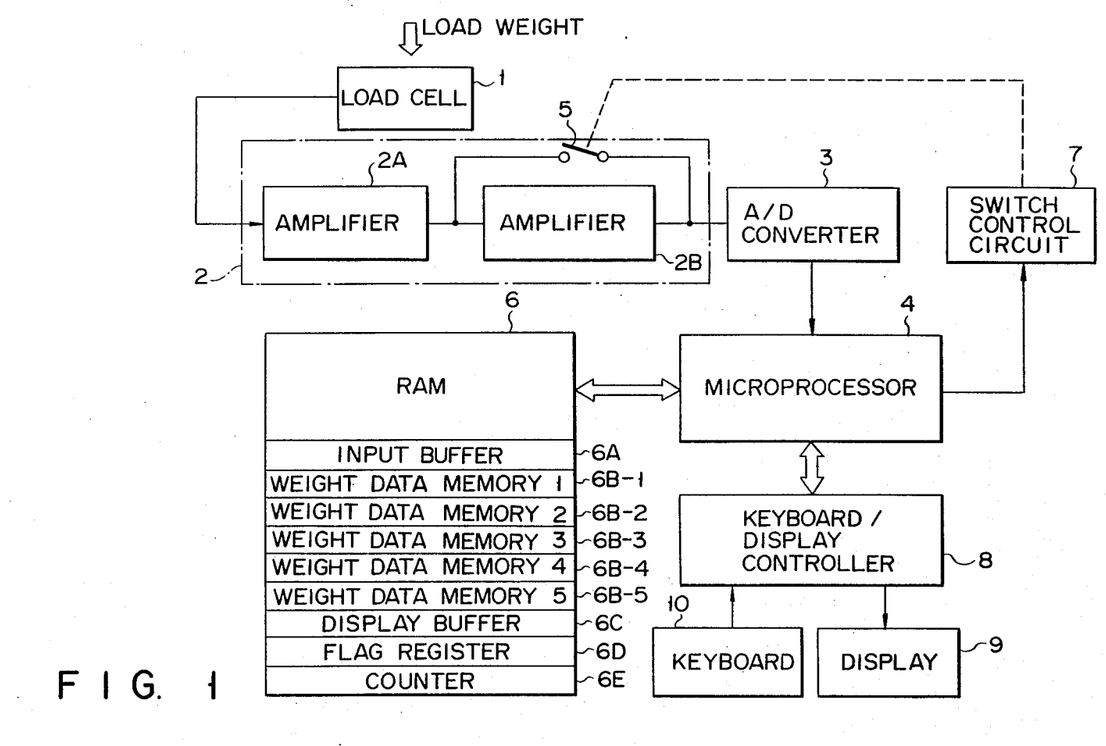
FIG. 1 is a circuit block diagram of a load cell weighing apparatus according to a first embodiment of the present invention.

FIG. 1 shows a circuit diagram of a load cell weighing apparatus according to the first embodiment of the present invention. In this load cell weighing apparatus, a light weight range or a heavy weight range can be selected as a weight range, and either range is selected in accordance with load weight. The light weight range is applicable to a load of 0 to 5 kg, and the heavy weight range is applicable to a load of more than 5 kg to 30 kg. This load cell weighing apparatus comprises a load cell 1 for generating an output voltage proportional to the weight of the load 1 applied thereon, an amplifier section 2 for amplifying the output voltage of the load cell 1, an analog/digital (A/D) converter 3 for converting an amplified output voltage of the amplifier section 2 to digital data, and a microprocessor 4 for processing the digital data which is supplied from the A/D converter 3 by interruption. The load cell weighing apparatus further comprises a RAM 6 connected to the microprocessor 4, a keyboard/display controller 8 connected to the microprocessor 4, a switch control circuit 7 connected to the microprocessor 4, an analog switch 5 connected to the switch control circuit 7, and a keyboard 10 and a display 9 both connected to the keyboard/display controller 8.

The microprocessor 4 includes an internal memory in which a control program is preset, and the microprocessor 4 is operated in accordance with the control program. The RAM 6 contains an input buffer 6A for storing digital data input from the A/D converter 3, weight data memories 6B-1 to 6B-5 for storing weight data representative of the weight corresponding to the digital data, a display buffer 6C for storing, as display data, the weight data expressed on a scale corresponding to a selected weighing range, a flag register 6D for storing a flag (i.e., a light weight range flag or a heavy weight range flag) corresponding to a selected weighing range and a flag indicating the change of the weighing range, and a counter 6E for storing the number of input digital data items The amplifier section 2 has front and rear amplifiers 2A and 2B connected in tandem The rear amplifier 2B is selectively shunted by the analog switch 5 connected between the input and output terminals of the amplifier 2B. The analog switch 5 is closed while the weighing range is set to the light weight range, and the switch 5 is opened while the weighing range is set to the heavy weight range. When the light weight range is selected, the output voltage of the load cell 1 is amplified by the amplifiers 2A and 2B and supplied to the A/D converter 3. In the case of the heavy weight range, the output voltage of the load cell 1 is amplified by the amplifier 2A and supplied to the A/D converter 3. The amplification factor of the amplifier section 2 in the case of the heavy weight range is 1/5 of that in the case of the light weight range.

Figure 2:
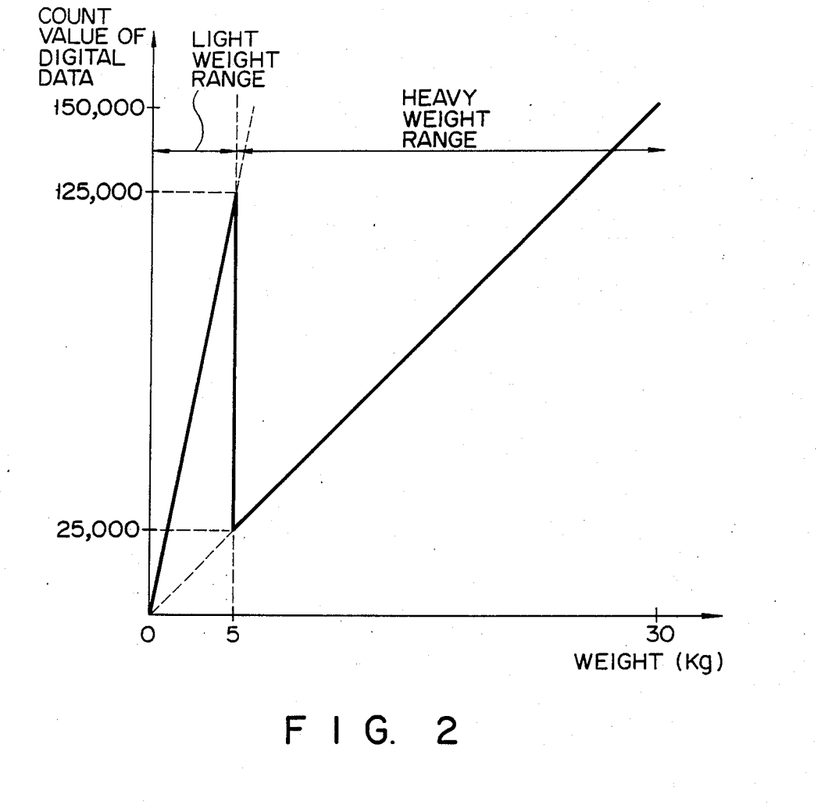
FIG. 2 is a graph showing a relationship between a load applied on the load cell shown in FIG. 1, and output data of an A/D converter.

The output data of the A/D converter 3 represents, in numerals, the output voltage of the amplifier section 2. The output data of the A/D converter 3 changes in accordance with the weight of the load, as shown in FIG. 2. The analog switch 5 is opened before the load is applied. When a load of 5 kg is applied on the load cell 1, the output of the A/D converter 3 becomes "125000" in accordance with the output voltage of the amplifier section 2. The analog switch 5 is closed when the output data of the A/D converter 3 becomes "125000" or higher by the application of a load. The count value "1" of the output data of the A/D converter 3 represents 0.04 g in the light weight range, and represents 0.2 g in the heavy weight range. The display 9 displays weight data obtained from the output from the A/D converter 3, after the variation in the weight data falls within ±1 scale division (or unit weight) determined in accordance with the weighing range. The unit weight is 0.2 g in the light weight range and 10 g in the heavy weight range. Thus, the stability of the measured weight is detected, when the variation in the weight data derived from the output data of the A/D converter 3 falls within ±0.2 g in the light weight range, or when the variation in the weight data output from the A/D converter 3 falls within ±10 g in the heavy weight range. Exceptionally, the condition of stability, (i.e., "±0.2 g") for the light weight range is used until the weight data obtained from the A/D converter 3 exceeds 5.1 Kg, even if the weighing range is changed from the light weight range to the heavy weight range due to the increase in the output data of the A/D converter 3 caused by the application of the load.

Figure 3:
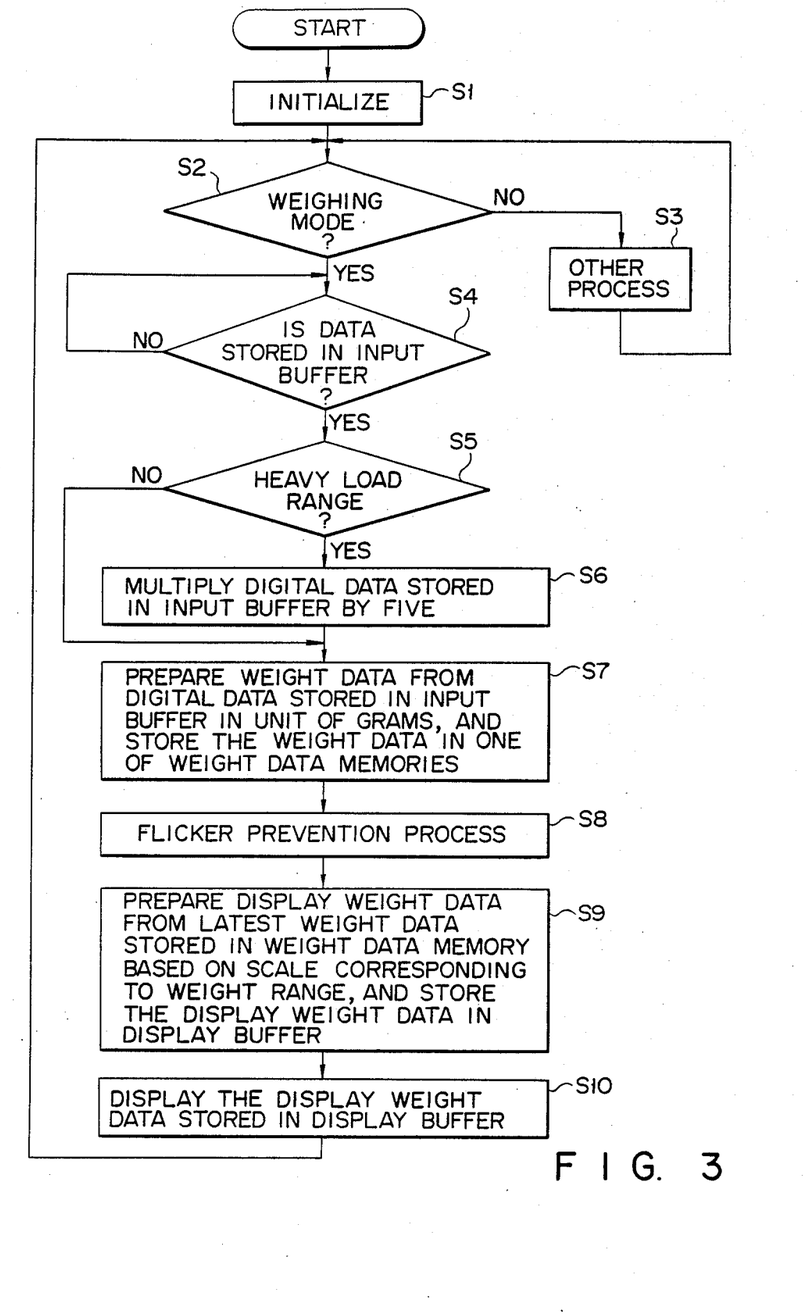
FIG. 3 is a flowchart illustrating the operation of the load cell weighing apparatus shown in FIG. 1.

The operation of the load cell weighing apparatus will now be described with reference to FIG. 3. FIG. 3 is a flowchart of the weighing processing performed by executing the control program upon the power "ON".

When the weighing processing is started, all circuit elements including the RAM 6 are initialized (step S1). In the initializing step, a flag corresponding to the light weight range is set in the flag register 6D, and value "0" is set in the counter 6E. The analog switch 5 is opened when the light weight range is selected. In step 2, it is checked whether or not the weighing mode is set by a command input from the keyboard 10. If the weighing mode is not set, other process is performed (step S3). Then, the process in step S2 is repeated.

When the selection of the weighing mode detected to be set, it is checked whether or not the output data (or digital data) of the A/D converter 3 has been stored in the input buffer 6A (step S4). If the digital data is not stored in the input buffer 6A, step S4 is repeated until the digital data is stored therein. If it is detected that the digital data has been stored in the input buffer 6A, it is then checked whether or not the heavy weight range is selected (step S5). If the heavy weight range is selected, the digital data stored in the input buffer 6A is multiplied by five (step S6), and the multiplied digital data is converted to weight data, with count value "1" being assigned to 0.04 g (step S7). The multiplication factor of the digital data is determined from the fact that the amplification factor of the amplifier section 2 in the heavy weight range is 1/5 of that in the light weight range. The weight data is stored in one of the weight data memories 6B-1 to 6B-5. The weight data memories 6B-1 to 6B-5 are sequentially used each time the weight data is produced. If the weight data memories 6B-1 to 6B-5 become full, the latest weight data is stored in that one of the weight data memories 6B-1 to 6B-5 in which has been stored the earliest weight data. At this time, the oldest data is erased. If the heavy weight range is not selected, the digital data stored in the input buffer 6A is converted to weight data, with count value "1" being assigned to 0.04 g, and the converted weight data is stored in one of the weight data memories 6B-1 to 6B-5, in step 7.

The latest weight data is subjected to a flicker prevention process in step S8. In the flicker prevention process, the latest weight data is compared with the weight data stored in the remaining ones of the weight data memories 6B-1 to 6B-5, thereby to determine the degree of fluctuation in the weight data items. In step S9, when the fluctuation is continuing, the latest weight data is converted to display data which represent the weight data on a scale corresponding to the weighing range, and then stored in the display buffer 6C. The display data stored in the display buffer 6C is transferred from the display buffer 6C to the keyboard/display controller 8 in step S10, and the display data is displayed on the display 9. When the fluctuation is almost terminated, the contents in the display buffer 6C is not changed in steps S9 and S10, and the process in step S2 is repeated.

Figure 4:
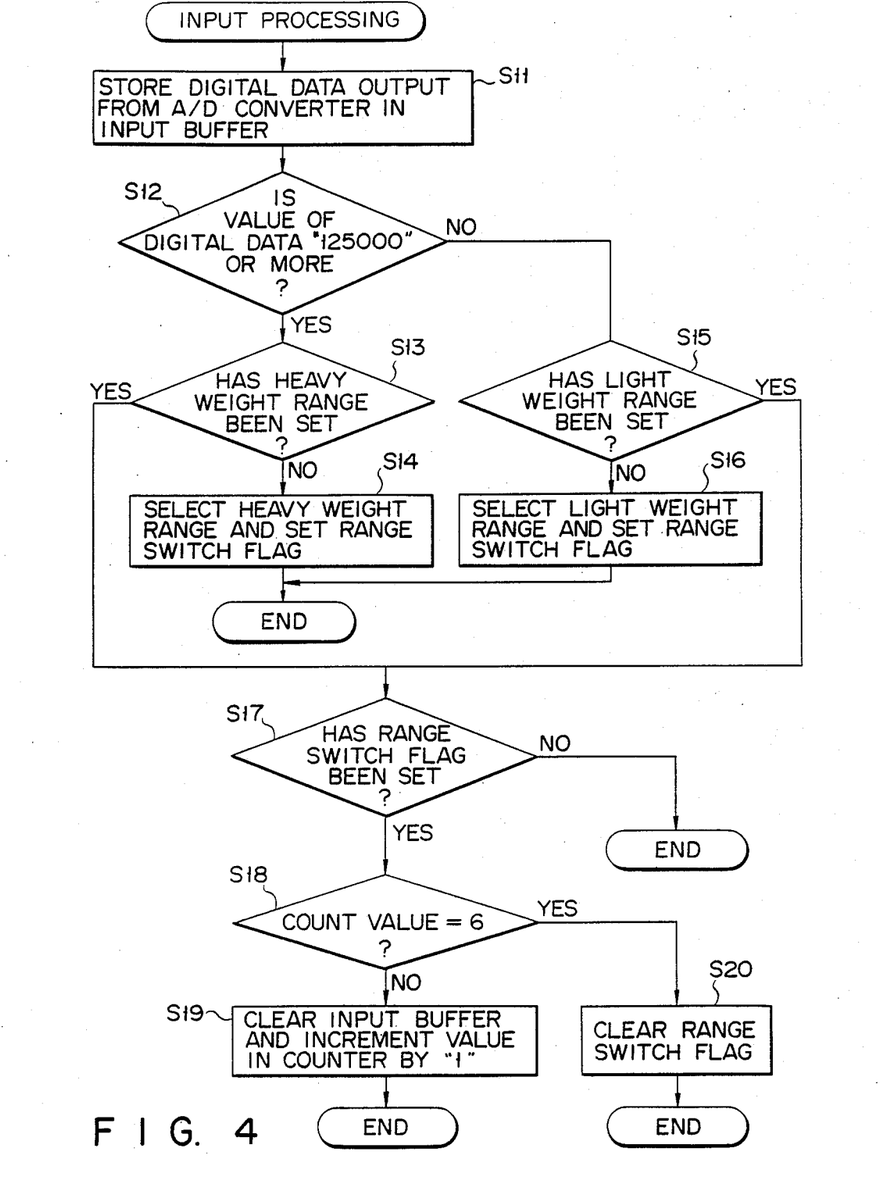
FIG. 4 is a flowchart illustrating the input processing of digital data which is input to a microprocessor from an A/D converter by an interruption.

The input processing of digital data supplied from the A/D converter 3 will now be described with reference to FIG. 4. FIG. 4 is a flowchart of the input processing. The microprocessor 4 suspends the processing illustrated in FIG. 3, in response to an interruption which is caused by the A/D converter 3 at an interval of 200 ms, and carries out the input processing. When the input processing is started, the microprocessor 4 receives digital data supplied from the A/D converter 3 and stores the received digital data in the input buffer 6A (step S11). In step S12, it is checked whether the count value of the stored digital data is 125000 (corresponding to 5 kg) or more in the state that the analog switch 5 is open. If the count value is 125000 or more, it is then checked in step S13 whether or not the heavy weight range is selected. If the heavy weight range is not selected, a heavy weight range flag and a range switch-over flag are set in the flag register 6D. When the heavy weight range is set in this manner, the switch control circuit 7 causes the analog switch 5 to be closed. Subsequent to the closing of the analog switch 5, the input processing is completed.

On the other hand, when it is checked in step S12 that the count value of the digital data is less than 125000, it is then checked in step S15 whether or not the heavy weight range is selected. If the heavy weight range is not selected, a light weight range flag and a range switch-over flag are set in the flag resister 6D in step S16. When the light weight range is set in this manner, the switch control circuit 7 causes the analog switch 5 to be opened. Following the opening of the analog switch 5, the input processing is completed.

Step S17 is performed when it is detected in step S13 that the heavy weight range is selected, or when it is detected in step S15 that the light weight range is selected. In step S17, it is checked whether or not the range switch-over flag is set in the flag register 6D. If the range switch-over flag is not set in the flag register 6D, the processing of input data (i.e., input processing) is completed. On the other hand, if the range switch-over flag is set, it is checked in step S18 whether or not the contents of the counter 6E is equal to the number of times of inputs "6" determined based on the time necessary for stabilization in the weighing operation. If the value in counter 6E is less than "6", the contents of the input buffer 6A is cleared in step S19, and the value in the counter 6E is incremented by one. Subsequently, the input processing is completed. If the value in counter 6E is "6", the range switch-over flag is cleared in step S20. Thus, the input processing is completed.

Figure 5:
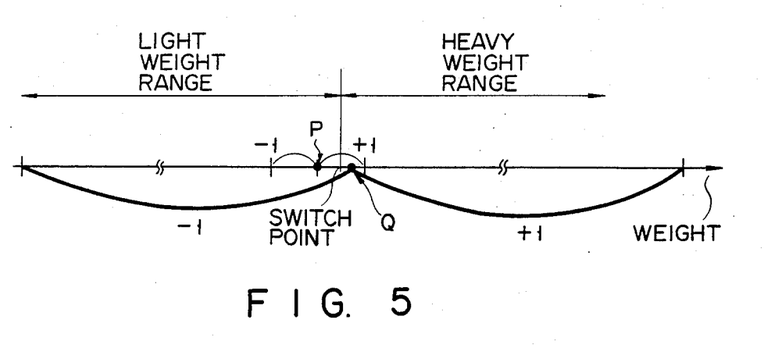
FIG. 5 illustrates a relationship between a switching point for the weighing range and a switching point for the stable weight detection condition in the load cell weighing apparatus shown in FIG. 1.
Figure 6:
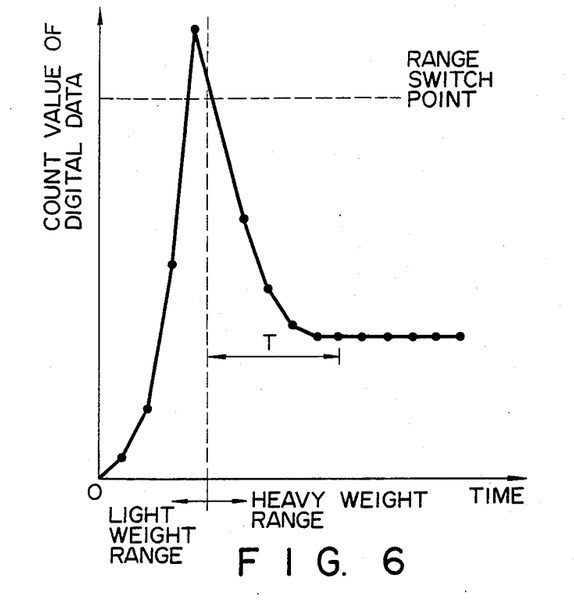
FIG. 6 is a graph showing a time period during which digital data input from the A/D converter to the microprocessor is not used and not converted to weight data.

The reason why the stable weight detection condition is not changed at a weight value corresponding to the switching point of the weighing capacity range will now be described with reference to FIG. 5. FIG. 5 shows a relationship between the switching point of the weighing capacity and the switching point of the stable weight detection condition. Suppose that a load slightly lighter than the switching point of the weighing capacity range is weighed. When the load is applied on the load cell 1, weight data corresponding to the output voltage of the load cell 1 is periodically produced. The weight data fluctuates within a range including P and Q shown in FIG. 5. In the case where the stable weight detection condition is ±0.2 g in the vicinity of point P and is ±10 g in the vicinity of point Q, the weight data, even if the load is lighter than the switching point of the weighing range, is erroneously detected by the stable weight detection condition of ±10 g while the detected weight value is varying in the vicinity of point Q. For this reason, the switching point of the stable weight detection condition is set to 5.1 kg which is higher than 5 kg or the switching point of the weighing range.

In the above embodiment, when a load of less than 5 kg is applied to the load cell 1, the load cell 1 generates an output voltage corresponding to the load weight, and this output voltage is amplified by the two amplifiers 2A and 2B of amplifier section 2. The output voltage of the amplifier section 2 is periodically converted to digital data by the A/D converter 3 and input to the microprocessor 4. Based on the input digital data, the microprocessor 4 produces weight data. When a variation in the weight data falls within a range of ±0.2 g, the stability of the measured weight is detected, and the weight of the load is determined.

Also, when a load of 5 kg or more is applied to the load cell 1, the output of the load cell 1 is processed, as described above. In this case, the microprocessor 4 detects, based on the digital data input from the A/D converter 3, that the weight of the load is 5 kg or more, and the microprocessor 4 switches the weight range from the light weight range to the heavy weight range. At this time, the switch control circuit 7 causes the analog switch 5 to be closed. As a result, the output voltage of the load cell 1 is amplified only by the amplifier 2A in the amplifier section 2.

Just after the switching of the weight range, the microprocessor 4 ignores five items of digital data input from the A/D converter 3. These ignored five items of digital data are not converted to weight data. The sixth digital data input from the A/D converter 3 is converted to weight data.

Since the sixth and subsequent digital data are treated as effective data, erroneous digital data due to the change-over of the weighing range can be eliminated. When the fluctuation in the weight data converted from the effective digital data falls within a range of ±10 g, the stability of the measured weight is detected, and the weight of the load is determined. Since the stability detection condition, ±0.2 g is applicable until the weight data exceeds 5.1 kg, high weighing precision can be maintained even if the weight of a load is slightly higher than 5.0 kg.

When the load is removed from the load cell 1, the value of digital data input from the A/D converter 3 to the microprocessor 4 lowers. Based on the lowering in value of the digital data, the microprocessor 4 switches the weighing capacity range from the heavy weight range to the light weight range, and causes the analog switch 5 to be opened.

In addition, just after the switch-over of the weighing range, the microprocessor 4 ignores the next five items of digital data input from the A/D converter 3, and does not convert the five items of digital data to weight data. Then, the microprocessor 4 converts the sixth and subsequent items of digital data to weight data.

Figure 7:
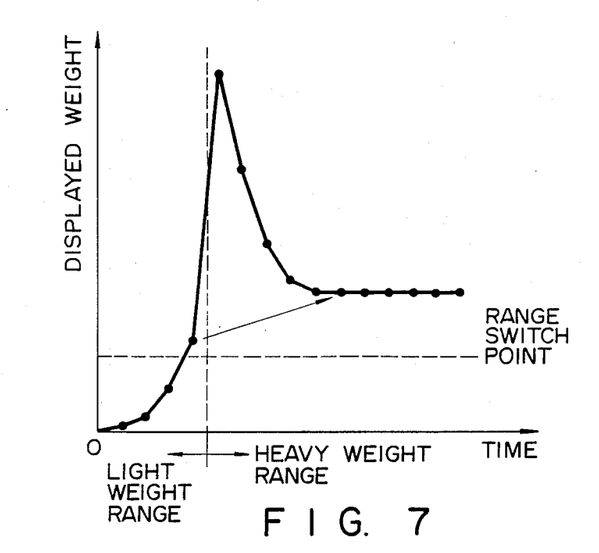
FIG. 7 is a graph illustrating a change in weight displayed on the display shown in FIG. 1.

As described above, when the weight of a load applied to the load cell 1 is 5 kg or more, the weighing range is automatically switched from the light weight range to the heavy weight range. Since digital data items input from the A/D converter 3 are not used in a time period T shown in FIG. 6, the displayed weight value is smoothly changed, as shown in FIG. 7 by an arrow, in a region including the range switch-over point.

Since, the switching point of the weight stability detection condition is set to 5.1 kg, which is slightly higher than the range switching point of 5 Kg, the weight stability detection can be performed with high precision in the vicinity of the range switching point. Thus, while the weight data varies in a range of ±1 to 2 g, the stability in measured weight is not detected.

Furthermore, in the above embodiment, the digital data input from the A/D converter 3 at the time of selection of the heavy weight range can be converted to a value equivalent to that of digital data input at the time of selection of the light weight range, it is not necessary to individually perform the flicker prevention process in heavy weight range and in the light weight range. Consequently, the control program used in the microprocessor 4 can be simplified, and the memory capacity required for storing the control program can be reduced.

The present invention is not limited to the above embodiment.

In the above embodiment, when it is detected that the digital data input from the A/D converter 3 is stored in the input buffer 6A and that the heavy weight range is selected, the digital data is multiplied by five in step S6. This multiplication is based on the fact that the amplification factor of the amplifier section 2 in the heavy weight range is 1/5 of that in the light weight range. However, the output voltage of the amplifier section 2, which is obtained from amplifiers 2A and 2B, is not strictly identical to the voltage obtained by multiplying by five the output voltage of the amplifier section 2, which is obtained from only amplifier 2A. Thus, it is possible to compensate an error in output voltage in step S6.

Figure 8:
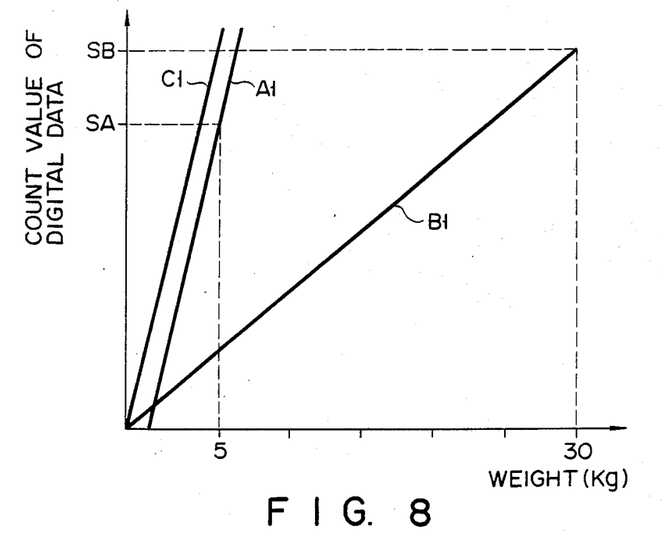
FIG. 8 is a graph showing a relationship between the load weight and output data of the A/D converter.

FIG. 8 is a graph showing a relationship between the weight of the load and the output data of the A/D converter 3. In FIG. 8, line A1 denotes an output characteristic in the light weight range and line B1 denotes an output characteristic in the heavy weight range. Line C1 indicates an output characteristic obtained by simply multiplying the inclination of line A1 by five. Symbol SA is representative of digital data corresponding to a maximum weight of the light weight range, and symbol SB is representative of digital data corresponding to a maximum weight of the heavy weight range. As seen from FIG. 8, line A1 does not coincide with line C1.

Figure 9:
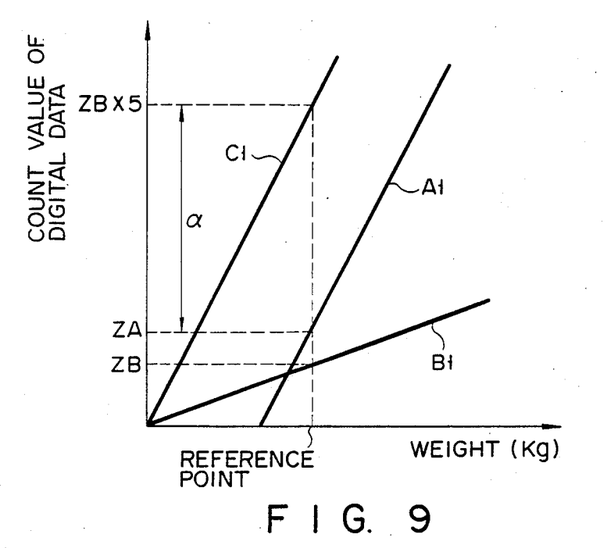
FIG. 9 is an enlarged view of a part of FIG. 8.

FIG. 9 is an enlarged view of a part of FIG. 8. In FIG. 9, symbol ZA indicates digital data obtained from line A1 in accordance with a given reference weight value, and symbol ZB indicates digital data obtained from line B1 in accordance with the reference weight value. Thus, when the digital data ZB is multiplied by five, the value of digital data ZB differs from the value of digital data ZA by a difference value $\alpha$ (i.e., ZB×5−ZA). In other words, if the digital data input from the A/D converter 3 in the heavy weight range and the difference value c is subtracted from the multiplied data, an error in output voltage of amplifier section 2 between the light weight range and the heavy weight range can be compensated and corrected.

Further, in the above embodiment, the amplification factor of amplifier section 2 is set to a value which is five times greater in the light weight range than in the heavy weight range mode. However, the amplification factor may be set to an integer greater than 1. In this case, in step S6, the digital data input from the A/D converter 3 in the heavy weight range is multiplied by a value corresponding to the amplification factor.

Furthermore, in the above embodiment, the amplifier section 2 comprises two amplifiers 2A and 2B which are connected in tandem. However, it is possible to increase the number of amplifiers in the amplifier section 2 in order to provide three or more weighing capacity ranges. In this case, the number of analog switches for switching the weighing capacity range needs to be increased.

What is claimed is:

1. A load cell weighing apparatus, comprising:
   a load cell unit for generating an output voltage corresponding to a load weight;
   amplifying means for amplifying the output voltage of said load cell unit and for providing an output voltage, said amplifying means having a plurality of amplifiers connected in series;
   analog/digital converting means for periodically converting the output voltage of said amplifying means to digital data;
   processing means, coupled to said analog/digital converting means, and including:
     means for electrically reducing the number of said amplifiers of said amplifying means when the digital data input from said analog/digital converting means exceeds a predetermined value corresponding to a weight at which a weighing range is switched from a light weight range to a heavy weight range;
     means for converting the digital data to weight data based on the amplification factor of said amplifying means determined by the number of stages of said amplifiers of said amplifying means;
     means for producing display data representing weight data on a scale of a corresponding weighing range; and
     means for inhibiting said digital data from being converted to said weight data for a predetermined period of time after the weighing range is switched from one of said light and heavy weight ranges to the other of said light and heavy weight ranges, said predetermined period of time being longer than a transition period during which the output voltage of said amplifying means changes due to the difference between the amplification factor of said amplifying means in the heavy weight range and the amplification factor of said amplifying means in the light weight range; and
   display means for displaying the display data supplied from said processing means.

2. A load cell weighing apparatus according to claim 1, wherein said plurality of amplifiers comprises:
   a first amplifier; and
   a second amplifier connected to receive an output voltage from said first amplifier.

3. A load cell weighing apparatus according to claim 2, wherein said electrically reducing means of said processing means includes an analog switch means coupled between input and output terminals of said second amplifier, for causing the output voltage of said first amplifier to be supplied to said analog/digital converting means through said second amplifier in said light weight range and not through said second amplifier in said heavy weight range.

4. A load cell weighing apparatus according to claim 1, wherein said processing means further includes:
   means for detecting a fluctuation in tiems of the weight data;
   means for determining the stability of the measured weight when the fluctuation falls within a first fluctuation range at the time of selection of the light weight range and within a second fluctuation range larger than said first fluctuation range at the time of selection of the heavy weight range; and
   means for allowing the display data already displayed on the display means to be maintained after the stability of the measured weight has been detected.

5. A load cell weighing apparatus according to claim 4, wherein the switching point of said first and second fluctuation ranges is set to a weight slightly heavier than the switching point of the light and heavy weighing ranges.

6. A load cell weighing apparatus according to claim 1, wherein said processing means further includes:
   means for multiplying the digital data input from said analog/digital converting means in the heavy weight range by a coefficient corresponding to the lowered amplification factor of said amplifying means; and
   means for commonly processing each of the digital data input from said analog/digital converting means in the light weight range and the digital data input from said analog/digital converting means in the heavy weight range and multiplied by the coefficient, to thereby obtain said weight data.

7. A load cell weighing apparatus according to claim 6, wherein said multiplying means includes means for subtracting the multiplied digital data by a constant for thereby causing the subtracted digital data in the heavy weight range to be equivalent to the digital data obtained in the light weight range.

8. A load cell weighing apparatus, comprising:
   a load cell unit for generating an output voltage corresponding to a load weight;
   amplifying means for amplifying the output voltage of said load cell unit and for providing an output voltage, said amplifying means having a plurality of amplifiers connected in series;
   analog/digital converting means for periodically converting the output voltage of said amplifying means to digital data;
   processing means, coupled to said analog/digital converting means, and including:
      means for electrically reducing the number of said amplifiers of said amplifying means when the digital data input from said analog/digital converting means exceeds a predetermined value corresponding to a weight at which a weighing range is switched from a light weight range to a heavy weight range;
      means for converting the digital data to weight data based on the amplification factor of said amplifying means determined by the number of stages of said amplifiers of said amplifying means; and
      means for producing display data representing weight data on a scale of a corresponding weighing range; and
   display means for displaying the display data supplied from said processing means;
   said processing means further including:
      means for detecting a fluctuation in items of the weight data;
      means for determining the stability of the measured weight when the fluctuation falls within a first fluctuation range at the time of selection of the light weight range and within a second fluctuation range larger than said first fluctuation range at the time of selection of the heavy weight range; and
      means for allowing the display data already displayed on the display means to be maintained after the stability of the measured weight has been detected.

9. A load cell weighing apparatus according to claim 8, wherein the switching point of said first and second fluctuation ranges is set to a weight slightly heavier than the switching point of the light and heavy weighing ranges.

10. A load cell weighing apparatus according to claim 8, wherein said plurality of amplifiers comprises:
   a first amplifier; and
   a second amplifier connected to receive an output voltage from said first amplifier.

11. A load cell weighing apparatus according to claim 10, wherein said electrically reducing means of said processing means includes an analog switch means coupled between input and output terminals of said second amplifier, for causing the output voltage of said first amplifier to be supplied to said analog/digital converting means through said second amplifier in said light weight range and not through said second amplifier in said heavy weight range.

12. A load cell weighing apparatus, comprising:
   a load cell unit for generating an output voltage corresponding to a load weight;
   amplifying means for amplifying the output voltage of said load cell unit and for providing an output voltage, said amplifying means having a plurality of amplifiers connected in series;
   analog/digital converting means for periodically converting the output voltage of said amplifying means to digital data;
   processing means, coupled to said analog/digital converting means, and including:
      means for electrically reducing the number of said amplifiers of said amplifying means when the digital data input from said analog/digital converting means exceeds a predetermined value corresponding to a weight at which a weighing range is switched from a light weight range to a heavy weight range;
      means for converting the digital data to weight data based on the amplification factor of said amplifying means determined by the number of stages of said amplifiers of said amplifying means; and
      means for producing display data representing weight data on a scale of a corresponding weighing range; and
   display means for displaying the display data supplied from said processing means;
   said processing means further including:
      means for multiplying the digital data input from said analog/digital converting means in the heavy weight range by a coefficient corresponding to the lowered amplification factor of said amplifying means; and
      means for commonly processing each of the digital data input from said analog/digital converting means in the light weight range and the digital data input from said analog/digital converting means in the heavy weight range and multiplied by the coefficient, to thereby obtain said weight data.

13. A load cell weighing apparatus according to claim 12, wherein said multiplying means includes means for subtracting the multiplied digital data by a constant for thereby causing the subtracted digital data in the heavy weight range to be equivalent to the digital data obtained in the light weight range.

14. A load cell weighing apparatus according to claim 12, wherein said plurality of amplifiers comprises:
   a first amplifier; and
   a second amplifier connected to receive an output voltage from said first amplifier.

15. A load cell weighing apparatus according to claim 14, wherein said electrically reducing means of said processing means includes an analog switch means coupled between input and output terminals of said second amplifier, for causing the output voltage of said first amplifier to be supplied to said analog/digital converting means through said second amplifier in said light weight range and not through said second amplifier in said heavy weight range.

* * * * *